United States Patent
Choi et al.

(10) Patent No.: US 9,851,270 B2
(45) Date of Patent: Dec. 26, 2017

(54) FORCE SENSOR AND MULTIAXIAL FORCE/TORQUE SENSOR USING THE SAME

(71) Applicant: Research and Business Foundation SUNGKYUNKWAN UNIVERSITY, Suwon-si (KR)

(72) Inventors: Hyouk Ryeol Choi, Gunpo-si (KR); Ui Kyum Kim, Anseong-si (KR); Dong Hyuk Lee, Cheongju-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 58 days.

(21) Appl. No.: 15/059,954

(22) Filed: Mar. 3, 2016

(65) Prior Publication Data
US 2016/0265987 A1 Sep. 15, 2016

(30) Foreign Application Priority Data
Mar. 11, 2015 (KR) .......................... 10-2015-0033681

(51) Int. Cl.
*G01L 5/16* (2006.01)
(52) U.S. Cl.
CPC .................................... *G01L 5/165* (2013.01)
(58) Field of Classification Search
CPC ....................................................... G01L 5/165
See application file for complete search history.

(56) References Cited

U.S. PATENT DOCUMENTS

| | | | | |
|---|---|---|---|---|
| 2001/0003326 A1* | 6/2001 | Okada | ..................... | G01L 5/165 200/516 |
| 2002/0189355 A1* | 12/2002 | Leonardson | ............ | G01L 1/148 73/514.32 |
| 2003/0222660 A1* | 12/2003 | Morimoto | ............... | G01L 1/142 324/661 |
| 2006/0169060 A1* | 8/2006 | Okada | ..................... | G01L 5/165 73/862.043 |
| 2007/0006668 A1* | 1/2007 | Hirabayashi | ............... | G01L 1/26 73/862.541 |
| 2007/0205776 A1* | 9/2007 | Harish | ..................... | G01G 7/06 324/662 |
| 2008/0018347 A1* | 1/2008 | Morimoto | ............... | G01L 1/142 324/662 |

(Continued)

*Primary Examiner* — Lisa Caputo
*Assistant Examiner* — Philip Cotey
(74) *Attorney, Agent, or Firm* — NSIP Law (57) ABSTRACT

Provided herein is a method and apparatus describing a force sensor that includes a ground unit that is a grounded conductor that changes its position according to an external force, and including a flat panel module that is a conductor of a flat panel shape, and a protruding module that is a conductor protruding from a lower surface of the flat panel module, a substrate of a flat panel shape arranged in a predetermined distance from the lower surface of the flat panel module, and having a hole through which the protruding module may be inserted, a first electrode formed on an upper surface of the substrate, to generate a capacitance together with the flat panel module upon receiving power, and a second electrode formed on the substrate, to generate a capacitance together with the protruding module upon receiving power.

19 Claims, 8 Drawing Sheets

(56) References Cited

U.S. PATENT DOCUMENTS

| | | | | |
|---|---|---|---|---|
| 2008/0178675 A1* | 7/2008 | Okada | ............... | G01L 1/144 |
| | | | | 73/514.32 |
| 2011/0005338 A1* | 1/2011 | Okada | ............... | G01L 5/0061 |
| | | | | 73/862.043 |
| 2011/0148811 A1* | 6/2011 | Kanehira | ............... | G06F 3/044 |
| | | | | 345/174 |
| 2013/0050108 A1* | 2/2013 | Hong | ............... | G06F 3/044 |
| | | | | 345/173 |
| 2013/0319135 A1* | 12/2013 | Okada | ............... | G01L 1/14 |
| | | | | 73/862.043 |
| 2014/0150562 A1* | 6/2014 | Warren | ............... | G01Q 60/366 |
| | | | | 73/780 |
| 2014/0174205 A1* | 6/2014 | Clarke | ............... | A61B 5/1038 |
| | | | | 73/862.626 |

\* cited by examiner

FORCE SENSOR AND MULTIAXIAL FORCE/TORQUE SENSOR USING THE SAME

CROSS-REFERENCE TO RELATED APPLICATION

This application claims the benefit of priority under 35 U.S.C. §119(a) of Korean Patent Application No. 10-2015-0033681, filed on Mar. 11, 2015, in the Korean Intellectual Property Office, the entire disclosure of which is incorporated herein by reference for all purposes.

BACKGROUND

1. Field

The following description relates to a force sensor and a multiaxial force/torque sensor using the same, and more particularly, to a force sensor capable of measuring an external force with precision, and a multiaxial force/torque sensor using the same.

2. Description of Related Art

Mechanical devices such as industrial robots are equipped with a sensor for measuring a force or torque being applied during operations.

A force and torque applied to such a mechanical device from various directions may affect the operations of the mechanical device, and thus in order to control the mechanical device with precision, a sensor for measuring the force and torque is required.

Korean Patent Registration No. 10-1470160 relates to a flat panel type force/torque sensor capable of measuring a force and torque from various directions, the sensor configured to measure a vertical force and horizontal force using a principle where, in response to an external force being applied in a vertical direction to a sensor cell, the distance between a first electrode and a second electrode decreases, increasing the capacitance, and in response to an external force being applied in a horizontal direction to the sensor cell, the size of areas facing each other of the first electrode and second electrode decreases, reducing the capacitance.

However, in such an electrode structure mentioned above, the changes in capacitance due to changes in distance between the electrodes are great, but the changes in capacitance due to changes in the size of areas facing each other of the electrodes are not great, thereby making it difficult to measure a horizontal force with precision.

SUMMARY

Therefore, a purpose of the present disclosure is to provide a force sensor and a multiaxial force/torque sensor using the same.

Another purpose of the present disclosure is to provide a force sensor capable of measuring with precision an external force of a vertical direction and a horizontal direction, and a multiaxial force/torque sensor using the same.

Another purpose of the present disclosure is to provide a force sensor having an electrode structure where the changes in the capacitance are great and where electrodes may not be easily separated by external impact, and a multiaxial force/torque sensor using the same.

According to an aspect of the present disclosure, there is provided a force sensor including a ground unit that is a grounded conductor that changes its position according to an external force, and including a flat panel module that is a conductor of a flat panel shape, and a protruding module that is a conductor protruding from a lower surface of the flat panel module; a substrate of a flat panel shape arranged in a predetermined distance from the lower surface of the flat panel module, and having a hole through which the protruding module may be inserted; a first electrode formed on an upper surface of the substrate, to generate a capacitance together with the flat panel module upon receiving power; and a second electrode formed on the substrate, to generate a capacitance together with the protruding module upon receiving power.

In addition, the distance between the protruding module and the first electrode may be greater than the distance between the protruding module and the second electrode even when the position of the ground unit changes according to the external force.

In addition, the distance between the protruding module and the second electrode may be shorter than the distance between the flat panel module and the second electrode.

In addition, a groove may be formed on a lower surface area of the flat panel module that overlaps the second electrode when seen from a plane view.

In addition, the distance between the flat panel module and the first electrode may be shorter than the distance between the protruding module and the first electrode.

In addition, the second electrode may be formed on one side of a hole of the substrate.

In addition, the second electrode may be formed to cover one side of a hole of the substrate, and an upper surface and a lower surface of the substrate in 'ㄷ' shape.

In addition, the second electrode may be formed in the shape of 'I' that penetrates the substrate.

In addition, the force sensor may further include an elastic body formed between the flat panel module and the substrate, the elastic body characterized to contract according to the external force and to return back to its original state when the external force is removed.

In addition, the force sensor may further include a capacitance measurement unit formed on the substrate, to measure the capacitance of the first electrode and the second electrode.

According to another aspect of the present disclosure, there is provided a multiaxial force/torque sensor including three or more force sensors; and an arithmetic operator for deriving a force and torque acting on the force sensors, wherein the force sensors are sensors as mentioned above, and are combined to have different azimuths from one another, and the arithmetic operator derives a multiaxial force and torque using capacitance values measured from a first electrode and a second electrode of the three or more force sensors.

In addition, the three or more force sensors may be arranged on a same plane around a same circumference and spaced by a same distance from one another.

As aforementioned, according to the present disclosure, there is provided a force sensor capable of measuring with precision a force of a horizontal direction and a force of a vertical direction using changes in the capacitance between a flat panel module and a first electrode and changes in the capacitance between a protruding module and a second electrode, and a multiaxial force/torque sensor using the same.

Furthermore, there is provided a force sensor wherein a second electrode has a shape of 'ㄷ' or 'I', so that the changes in capacitance are great, and the electrode may not be easily separated by external impact, and a multiaxial force/torque sensor using the same.

DETAILED DESCRIPTION

The present disclosure relates to a force sensor and a multiaxial force/torque sensor using the same, and hereinafter the sensor according to the present disclosure will be explained in detail with reference to FIGS. 1 to 8.

Figure 1:
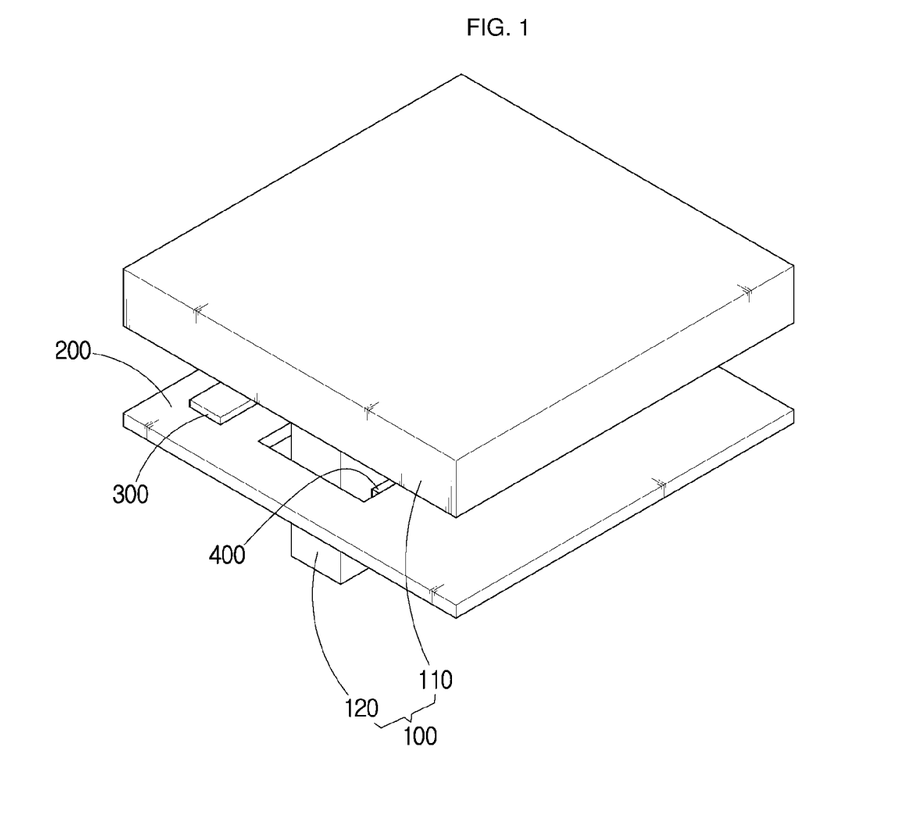
FIG. 1 is a perspective view of a force sensor according to an embodiment of the present disclosure.
Figure 2:
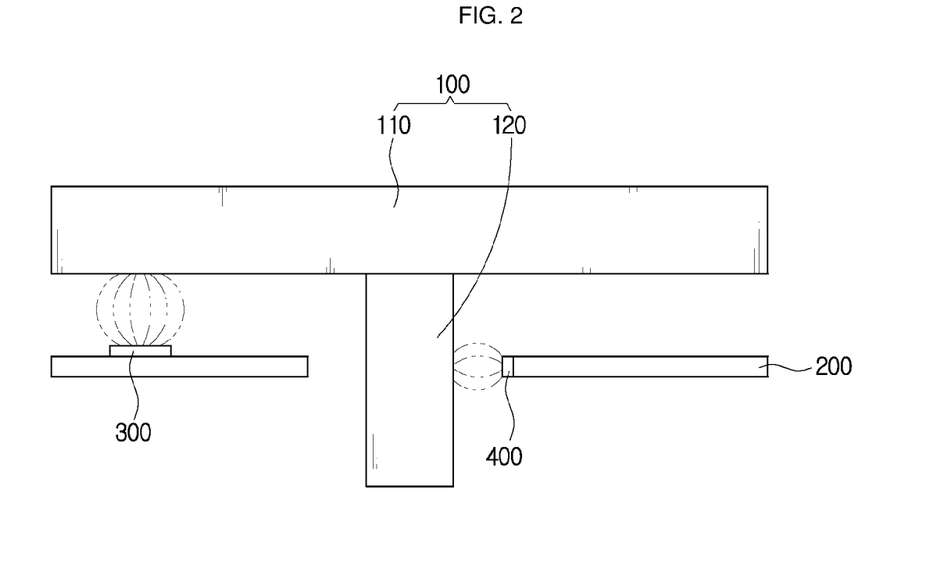
FIG. 2 is a cross-sectional view of the force sensor according to the embodiment of the present disclosure.

FIG. 1 is a perspective view of a force sensor according to an embodiment of the present disclosure, and FIG. 2 is a cross-sectional view of the force sensor according to an embodiment of the present disclosure.

As illustrated in FIGS. 1 and 2, the force sensor according to an embodiment of the present disclosure includes a ground unit 100, substrate 200, first electrode 300 and second electrode 400.

The ground unit 100 is a grounded conductor configured to change its position in response to an external force. The ground unit 100 includes a flat panel module 110 that is a conductor having a flat panel shape, and a protruding module 120 formed to protrude from a lower surface of the flat panel module 110 as illustrated.

The substrate 200 has the shape of a flat panel arranged in a predetermined distance from a lower surface of the flat panel module 110. For example, the substrate 200 may consist of a PCB (Printed Circuit Board).

Furthermore, as illustrated, the substrate 200 has a hole on one portion through which the protruding module 120 may be inserted.

The first electrode 300 is an electrode formed on an upper surface of the substrate 200 as illustrated in FIG. 2. When power is received, the first electrode 300 generates a capacitance together with the flat panel module 110 arranged adjacent to the first electrode 300.

Herein, in the case where the first electrode 300 is arranged closer to the protruding module 120 than to the flat panel module 110, a problem may occur where a capacitance is generated between the first electrode 300 and protruding module 120.

Therefore, the first electrode 300 is arranged such that the distance between the flat panel module 110 and first electrode 300 is shorter than the distance between the protruding module 120 and first electrode 300. This arrangement of the distance between the flat panel module 110 and first electrode 300 being shorter than the distance between the protruding module 120 and first electrode 300 is to be maintained even when the ground unit 100 changes its position by an external force.

The second electrode 400 is an electrode formed adjacent to the hole of the substrate 200 as illustrated in FIG. 2. When power is received, the second electrode 400 generates a capacitance together with the protruding module 120.

Therefore, on the contrary to the first electrode 300, the second electrode 400 is arranged such that its distance from the protruding module 120 is shorter than its distance from the flat panel module 110, and this arrangement is to be maintained even when the ground unit 100 changes its position by an external force.

Furthermore, the second electrode 400 may be formed only on one side of the hole of the substrate 200 as illustrated in FIG. 2. However, this makes it difficult to form the second electrode 400 with a large size area, which means that it is difficult to generate a high capacitance, and the second electrode 400 may be easily separated by external force, which is a problem.

Figure 3A:
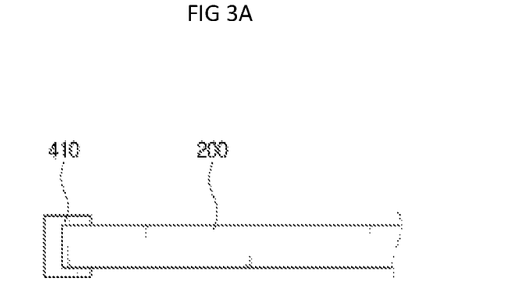
FIG. 3A-3B are views of a second electrode with an improved shape.
Figure 3B:
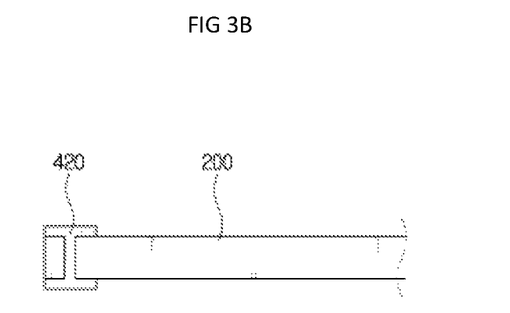

FIG. 3 are views of shapes of the second electrode that may solve the aforementioned problems.

First of all, as illustrated in FIG. 3A, it is possible to form a second electrode 410 in the shape of 'ㄷ' that covers one side of the hole of the substrate 200, and an upper surface and lower surface of the substrate, such that the size area of the second electrode 410 is increased to generate a high capacitance, and that the second electrode 410 may not be easily separated by external force.

Furthermore, as illustrated in FIG. 3B, it is possible to form a second electrode 420 in the shape of 'I' that penetrates the substrate 200, thereby increasing the size area of the second electrode 420 and preventing it from being separated by external impact.

The aforementioned shapes of the second electrode 410, 420 are mere examples, and thus, the second electrode 400 may be formed in any shape as long as it is provided in the substrate 200 to form a capacitance between itself and the protruding module 120.

Figure 4:
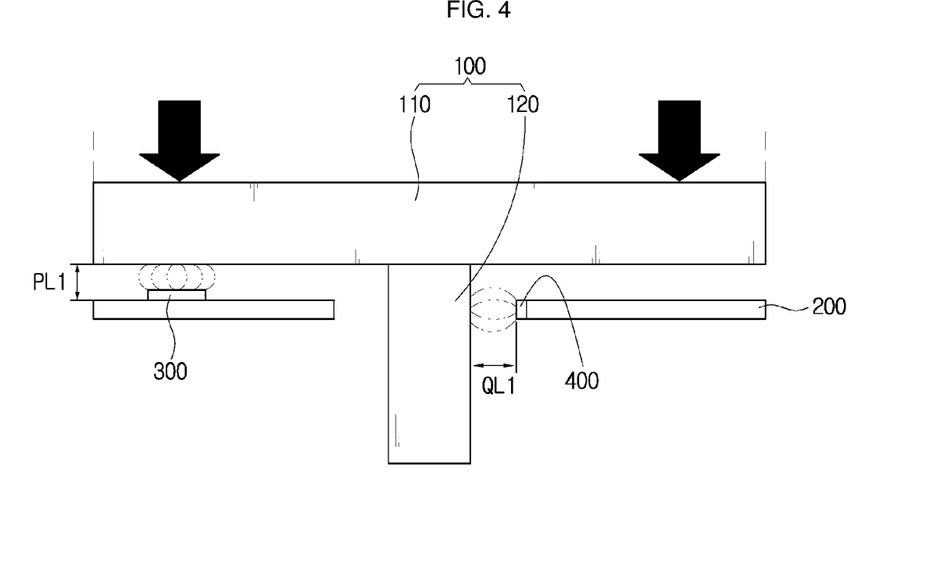
FIG. 4 is a view illustrating changes in the capacitance between a first electrode and a second electrode in response to an external force being applied to a ground unit in a vertical direction.

FIG. 4 is a view illustrating changes in the capacitance between the first electrode and second electrode in response to an external force being applied in a vertical direction to the ground unit.

As illustrated, as an external force is applied in a vertical direction to the ground unit 100, the position of the ground unit 100 will change, and therefore the distance (PL1) between the flat panel module 110 and the first electrode 300 will gradually reduce, thereby gradually increasing the capacitance being formed between the flat panel module 110 and first electrode 300, while the distance (QL1) between the protruding module 120 and the second electrode 400 is constantly maintained, thereby causing no changes in the capacitance between the protruding module 120 and second electrode 400.

Therefore, it is possible to assume the size of the external force being applied in a vertical direction to the ground unit 100 using changes in the capacitance being generated between the flat panel module 110 and the first electrode 300.

Figure 5:
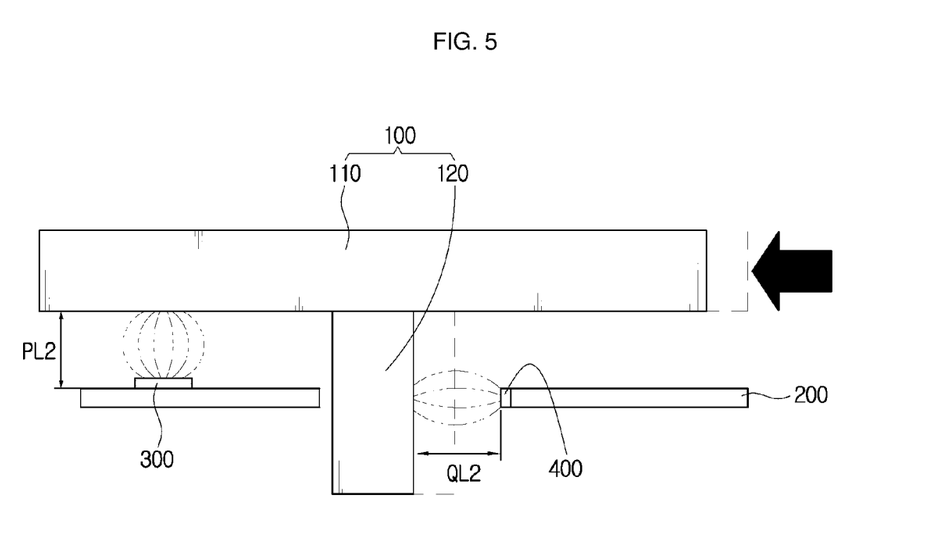
FIG. 5 is a view illustrating changes in the capacitance between the first electrode and the second electrode in response to an external force being applied to the ground unit in a horizontal direction.

FIG. 5 is a view illustrating changes in the capacitance between the first electrode and second electrode in response to an external force being applied in a horizontal direction to the ground unit.

As illustrated, as an external force is applied in a horizontal direction to the ground unit 100, the position of the ground unit 100 will change, but while the distance (PL2) between the flat panel module 110 and the first electrode 300 remains the same, the distance (QL2) between the protruding module 120 and the second electrode 400 will increase, thereby gradually reducing the capacitance being formed between the protruding module 120 and second electrode 400.

Therefore, it is possible to assume the size of the external force being applied in a horizontal direction to the ground unit 100 using changes in the capacitance being generated between the protruding module 120 and the second electrode 400.

Figure 6:
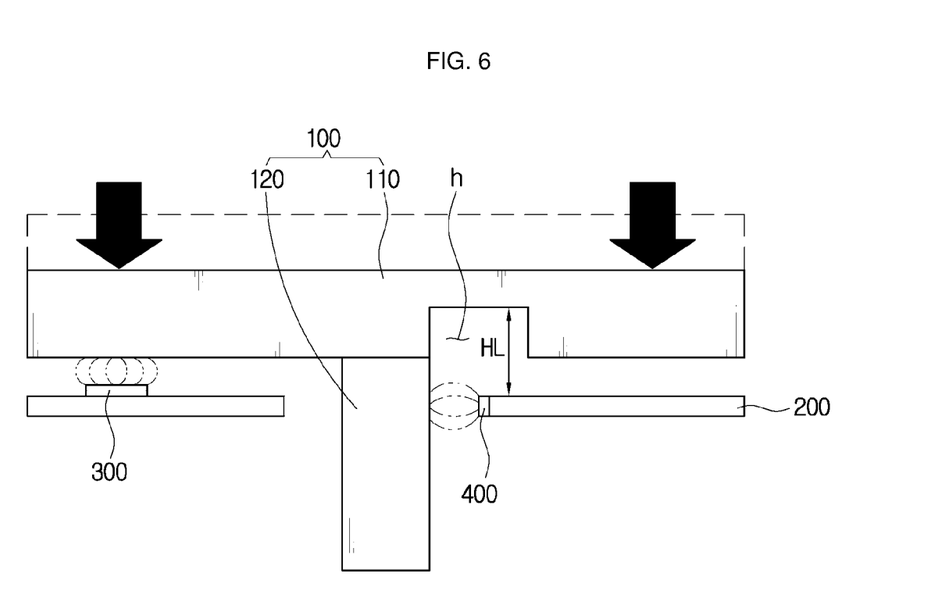
FIG. 6 is a view illustrating a flat panel module with an improved shape.

FIG. 6 is a view illustrating a flat panel module with an improved shape.

As illustrated in FIG. 4, in the case where an external force is applied in a vertical direction to the ground unit 100, the flat panel module 110 will gradually get closer to the second electrode 400, and accordingly, if the distance between the flat panel module 110 and the second electrode 400 becomes shorter than the distance between the protruding module 120 and the second electrode 400, there occurs a problem where a capacitance is generated between the flat panel module 110 and the second electrode 400, making it impossible to recognize an external force being applied in a horizontal direction to the ground unit 100.

The flat panel module illustrated in FIG. 6 is a flat panel module having an improved shape in order to solve the aforementioned problem. Herein, a groove (h) is formed on an area of the flat panel module 110 that overlaps the second electrode 400 when seen from a plane view, so that even when the flat panel module 110 and the second electrode 400 approach each other, the distance between the second electrode 400 and the flat panel module 110 will be greater than the distance between the second electrode 400 and protruding module 120, thereby preventing a capacitance from being generated between the second electrode 400 and flat panel module 110.

As aforementioned, in a force sensor according to an embodiment of the present disclosure, the capacitance between the first electrode 300 and the flat panel module 110 and the capacitance between the second electrode 400 and the protruding module 120 will change according to an external force being applied. Therefore, changes in the capacitance of a force sensor according to an embodiment of the present disclosure may be measured by a capacitance measurement unit (not illustrated) provided in, for example, the substrate 200, and then the capacitance measured by a capacitance measurement unit may be provided in a system that uses the force sensor, so that the system may measure the external force being applied to the force sensor based on a pre-stored table of external forces by capacitance.

Figure 7:
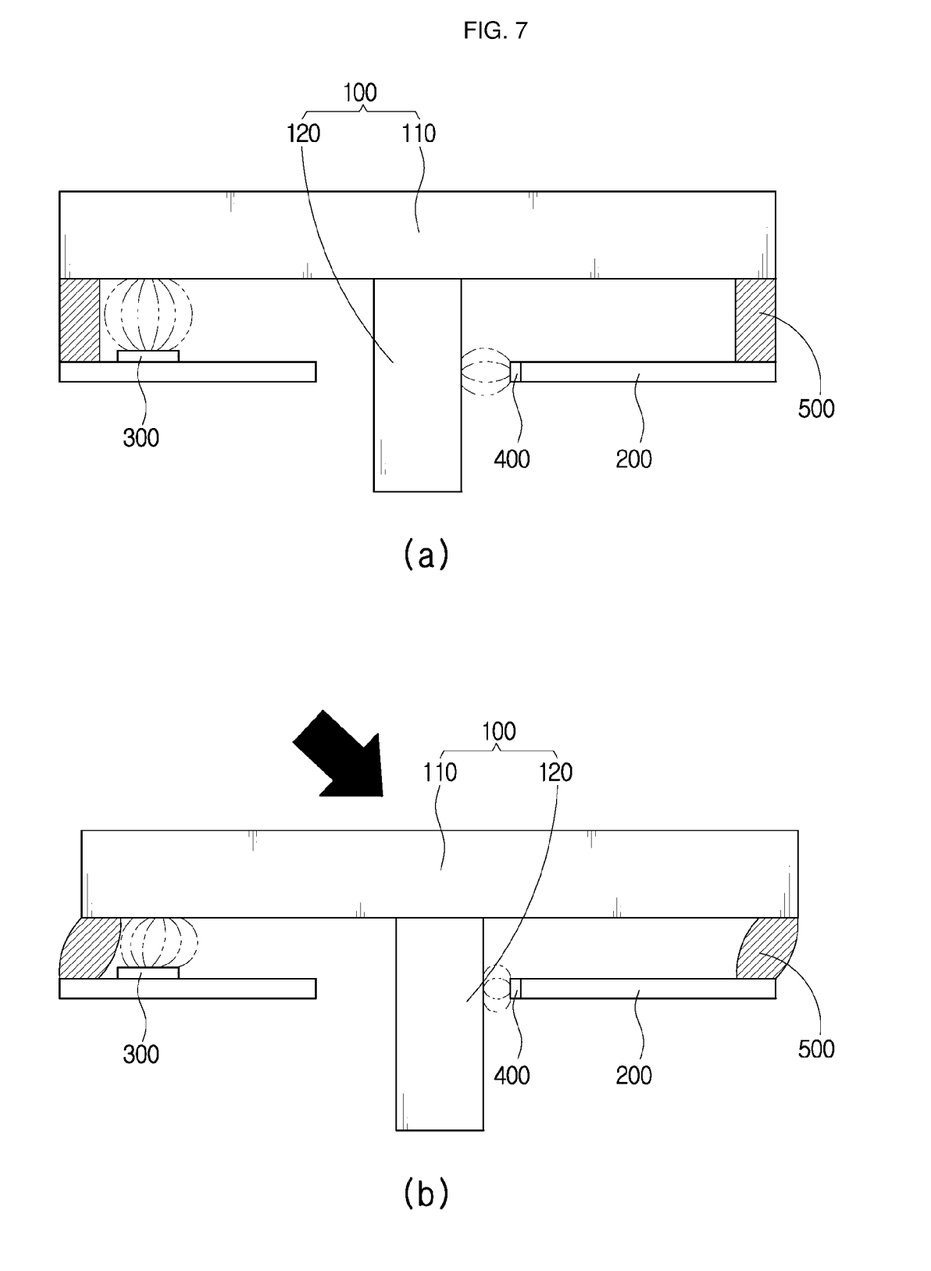
FIG. 7 are views illustrating a structure of a force sensor according to another embodiment of the present disclosure.

FIG. 7 is a view illustrating a structure of a force sensor according to another embodiment of the present disclosure.

As illustrated, the force sensor according to another embodiment of the present disclosure is characterized to include an elastic body 500 between the flat panel module 110 and the substrate 200.

As illustrated in (b) of FIG. 7, the elastic body 500 is formed to contract as an external force is applied, and to return to its original state when the external force is removed, so that then the external force applied to the ground unit 100 is removed, the ground unit 100 may return to its original position.

Furthermore, by adjusting the elasticity of the elastic body 500, it is possible to adjust the size of the external force that the force sensor of the present disclosure can measure.

More specifically, for example, if an elastic body that contracts by 10 mm when subject to a force of 10 is replaced by a stronger elastic body that contracts by 5 mm when subject to a force of 10, the changes of the position of the ground unit 100 will be reduced to half of what it used to, thereby enabling one to measure a greater external force even when the ground unit changes its position the same as before.

However, in the case of reinforcing the elasticity of the elastic body 500 as aforementioned, the elastic body 500 will contract less in response to the changes in an external force, which means that the changes in capacitance being generated between the electrodes 300, 400 and the ground unit 100 will become small as well, making it difficult to measure the changes in an external force with precision.

Therefore, it is desirable to adjust the elasticity of the elastic body depending on the application field where the force sensor is to be used, and then use the force sensor.

Figure 8:
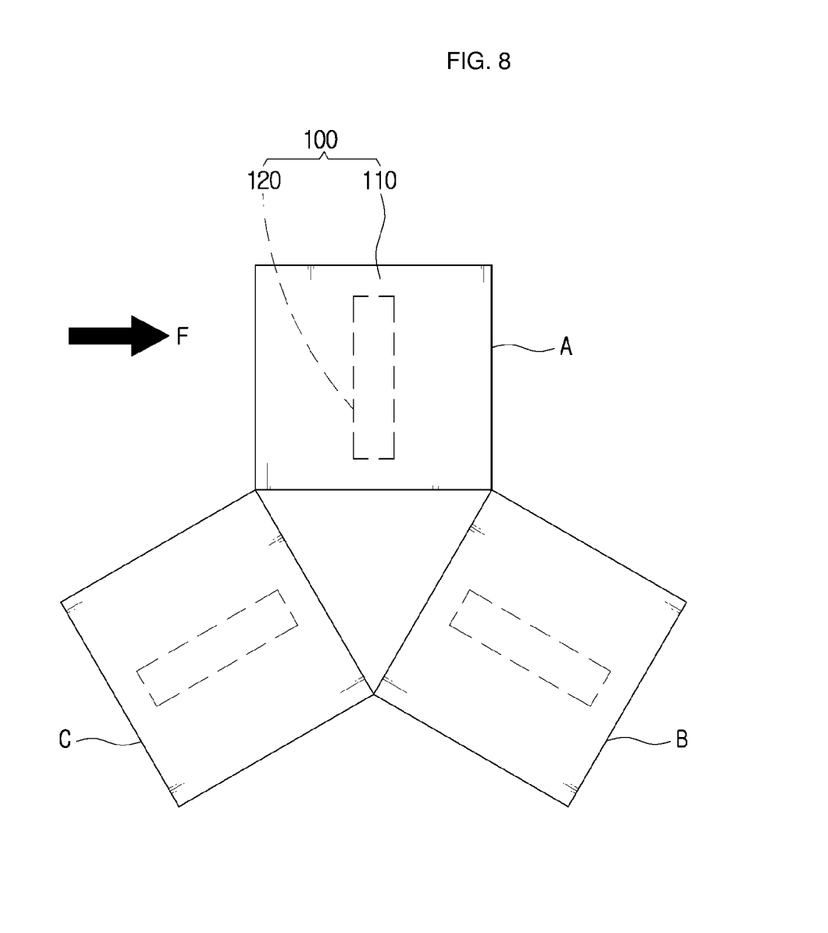
FIG. 8 is a view illustrating a multiaxial force/torque sensor according to the present disclosure.

FIG. 8 is a view illustrating a multiaxial force/torque sensor according to the present disclosure.

As illustrated, the multiaxial force/torque sensor according to the present disclosure has three or more force sensors (A, B, C) each having a different azimuth, and an arithmetic operator (not illustrated) for deriving a force and torque acting on the force sensor (A, B, C).

Herein, the force sensors (A, B, C) may be combined in arrangements that form various azimuths from one another, but it is most desirable that the force sensors (A, B, C) are arranged on a same plane around a same circumference and spaced from one another by a same distance, such that the force and torque from various directions may be evenly distributed to each sensor.

Furthermore, in the multiaxial force/torque sensor according to the present disclosure, the capacitance being generated in the first electrode 300 and the second electrode 400 included in each sensor (A, B, C) will change according to the force and torque applied from various directions, and thus the arithmetic operator may calculate a multiaxial force/torque by substituting the changing capacitance values into a pre-stored table.

Referring to FIG. 8, hereinafter a method for measuring a force and torque according to the present disclosure will be explained in greater detail by way of an example of a multiaxial force/torque sensor wherein three force sensors (A, B, C) are arranged around a same circumference and spaced by a same distance from one another.

As illustrated, when a horizontal force is applied to the multiaxial force/torque sensor in F direction thereby moving the ground unit 100 of force sensor A by L, force sensors B and C will each move by L×Sin 30°, and although there will be no changes in the capacitance of the first electrode of the force sensors A, B, C, the capacitance of the second electrode of each force sensor will change differently depending on the difference of the moved distance.

The arithmetic operator is a device using the aforementioned characteristics of a force sensor. The arithmetic operator may pre-store in a table the capacitance values of each electrode that vary depending on various external forces, so as to derive a multiaxial force/torque applied to an electrode using the pre-stored capacitance values.

Herein, as the multiaxial force/torque sensor deteriorates with time, the capacitance values of an electrode may differ even by a same force, and thus it is desirable to update the table stored in the arithmetic operator through a calibration process at regular intervals.

While this disclosure includes an embodiment of a force sensor and a multiaxial force/torque sensor using the same, various changes in form and details may be made in this embodiment without departing from the spirit and scope of the claims and their equivalents.

What is claimed is:

1. A force sensor, comprising:
   a ground unit that is a grounded conductor, configured to change position according to an external force, and comprising
      a flat panel module that is a conductor, and
      a protruding module that is a conductor and that protrudes from a lower surface of the flat panel module;
   a substrate positioned at a distance from the lower surface of the flat panel module, and comprising a flat panel shape and a hole through which the protruding module is inserted;
   a first electrode formed on an upper surface of the substrate and configured to generate a first capacitance with the flat panel module upon receiving power; and
   a second electrode formed on the substrate and configured to generate a second capacitance with the protruding module upon receiving power,
   wherein a distance between the protruding module and the second electrode is shorter than a distance between the flat panel module and the second electrode.

2. The force sensor according to claim 1,
   wherein a distance between the protruding module and the first electrode is greater than the distance between the protruding module and the second electrode when no external force is applied to the ground unit and when the position of the ground unit changes according to the external force.

3. A multiaxial force/torque sensor, comprising:
   three or more of the force sensors according to claim 2, arranged to have different azimuths from one another; and
   an arithmetic operator configured to derive a multiaxial force and torque using the first and second capacitance of the force sensors.

4. The multiaxial force/torque sensor, according to claim 3,
   wherein the three or more of the force sensors are arranged on a same plane around a same circumference, and spaced by a same distance from one another.

5. The force sensor according to claim 1, wherein
   a groove extends into a lower surface of the flat panel module facing the second electrode,
   the second electrode is disposed between a first wall of the groove and a second wall of the groove, and
   the first wall is parallel to the second wall.

6. A multiaxial force/torque sensor, comprising:
   three or more of the force sensors according to claim 5, arranged to have different azimuths from one another; and
   an arithmetic operator configured to derive a multiaxial force and torque using the first and second capacitance of the force sensors.

7. The multiaxial force/torque sensor according to claim 6,
   wherein the three or more of the force sensors are arranged on a same plane around a same circumference, and spaced by a same distance from one another.

8. The force sensor according to claim 1,
   wherein a distance between the flat panel module and the first electrode is shorter than a distance between the protruding module and the first electrode.

9. A multiaxial force/torque sensor, comprising:
   three or more of the force sensors according to claim 8, arranged to have different azimuths from one another; and
   an arithmetic operator configured to derive a multiaxial force and torque using the first and second capacitance of the force sensors.

10. The multiaxial force/torque sensor according to claim 9,
    wherein the three or more of the force sensors are arranged on a same plane around a same circumference, and spaced by a same distance from one another.

11. The force sensor according to claim 1,
    wherein the second electrode is formed on a side of the hole of the substrate.

12. A multiaxial force/torque sensor, comprising:
    three or more of the force sensors according to claim 11, arranged to have different azimuths from one another; and
    an arithmetic operator configured to derive a multiaxial force and torque using the first and second capacitance of the force sensors.

13. The multiaxial force/torque sensor according to claim 12,
    wherein the three or more of the force sensors are arranged on a same plane around a same circumference, and spaced by a same distance from one another.

14. The force sensor according to claim 1, wherein
    the second electrode is formed to cover a side of the hole of the substrate, and
    the second electrode comprises a '[' shaped cross section that receives a lip of the substrate.

15. The force sensor according to claim 1, wherein
    the second electrode comprises an 'I' shaped cross section that receives a lip of the substrate.

16. The force sensor according to claim 1,
    further comprising an elastic body joining the flat panel module and the substrate.

17. The force sensor according to claim 1,
    further comprising a capacitance measurement unit formed on the substrate and configured to measure the first and second capacitance.

18. A multiaxial force/torque sensor, comprising:
    three or more of the force sensors according to claim 1, arranged to have different azimuths from one another; and
    an arithmetic operator configured to derive a multiaxial force and torque using the first and second capacitance of the force sensors.

19. The multiaxial force/torque sensor according to claim 18,
    wherein the three or more of the force sensors are arranged on a same plane around a same circumference, and spaced by a same distance from one another.

* * * * *